(12) United States Patent
Samie et al.

(10) Patent No.: US 8,678,078 B2
(45) Date of Patent: Mar. 25, 2014

(54) METHOD AND APPARATUS TO TRANSFER HEAT TO AUTOMATIC TRANSMISSION FLUID USING ENGINE EXHAUST GAS FEED STREAM

(75) Inventors: Farzad Samie, Franklin, MI (US); Richard W. Carlson, Joliet, IL (US); Thomas A. Robertson, Jr., Romeo, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 51 days.

(21) Appl. No.: 13/104,170

(22) Filed: May 10, 2011

(65) Prior Publication Data

US 2011/0209865 A1 Sep. 1, 2011

Related U.S. Application Data

(62) Division of application No. 11/856,229, filed on Sep. 17, 2007, now abandoned.

(60) Provisional application No. 60/827,082, filed on Sep. 27, 2006.

(51) Int. Cl.
*F28F 13/12* (2006.01)
*F01M 5/00* (2006.01)
*F01M 1/16* (2006.01)
*F02M 25/07* (2006.01)

(52) U.S. Cl.
USPC ........... 165/299; 165/41; 165/51; 165/103; 165/300; 123/142.5 R; 123/41.31; 123/41.33; 123/568.12; 74/606 A; 475/161; 184/6.12; 184/6.21; 184/622; 184/104.1; 184/104.2; 184/104.3; 60/320; 60/321; 60/912

(58) Field of Classification Search
USPC ........... 165/41, 51, 276, 96, 299, 300, 297, 165/103; 123/142.5 R, 41.31, 41.33, 123/568.12; 74/606 A; 475/161; 184/6.12, 184/6.21, 6.22, 104.1, 104.2, 104.3; 60/320, 321, 912
See application file for complete search history.

(56) References Cited

U.S. PATENT DOCUMENTS

| | | | | |
|---|---|---|---|---|
| 4,391,235 A * | 7/1983 | Majkrzak | ............ | 123/142.5 R |
| 6,543,427 B2 * | 4/2003 | Kawasaki | ............ | 123/568.12 |
| 6,874,488 B2 * | 4/2005 | Ieda | ............ | 123/568.27 |
| 2005/0202933 A1 * | 9/2005 | Sorab et al. | ............ | 477/161 |

FOREIGN PATENT DOCUMENTS

JP 2005 299592 A 10/2005

* cited by examiner

*Primary Examiner* — John Ford

(57) ABSTRACT

Transmission fluid is heated through a heat exchanger effective to transfer heat between transmission fluid of a transmission assembly and an exhaust gas feed stream of an engine.

6 Claims, 3 Drawing Sheets

METHOD AND APPARATUS TO TRANSFER HEAT TO AUTOMATIC TRANSMISSION FLUID USING ENGINE EXHAUST GAS FEED STREAM

CROSS REFERENCE TO RELATED APPLICATIONS

This application is a divisional application of pending U.S. patent application Ser. No. 11/856,229 filed Sep. 27, 2007, which claims the benefit of U.S. Provisional Application No. 60/827,082 filed on Sep. 27, 2006 both of which are incorporated herein by reference.

TECHNICAL FIELD

The present disclosure is related to powertrains having internal combustion engines and automatic transmissions.

BACKGROUND

Vehicle and powertrain designers seek to improve efficiency and vehicle fuel economy. One aspect of improving fuel economy includes reducing energy losses through a transmission assembly. Automatic transmissions are complex assemblies, incorporating fluid coupling, multiple gear sets, and other sources of inefficiency. Spin loss is a term known in the art as a measure quantifying the torque lost in a transmission assembly: torque applied by the engine minus spin loss equals the torque output by the transmission assembly. Reducing spin loss in a transmission assembly reduces fuel required for the engine to create the same torque output in the transmission assembly. Testing has shown that spin loss is highly dependent upon the operating temperature of the transmission assembly. Transmission assemblies are designed to operate optimally at a particular temperature corresponding to the steady state conditions within an operating vehicle. Spin losses attributable to a transmission operating at temperatures below the steady state condition may be reduced by bringing the transmission up to temperature more quickly.

SUMMARY

An apparatus for heating transmission fluid includes a heat exchanger effective to transfer heat between transmission fluid of a transmission assembly and an exhaust gas feed stream of an engine. A flow valve selectively controls flow of the exhaust gas feed stream through the heat exchanger based upon temperature of said transmission fluid.

BRIEF DESCRIPTION OF THE DRAWINGS

One or more embodiments will now be described, by way of example, with reference to the accompanying drawings, in which.

DETAILED DESCRIPTION

Figure 1:
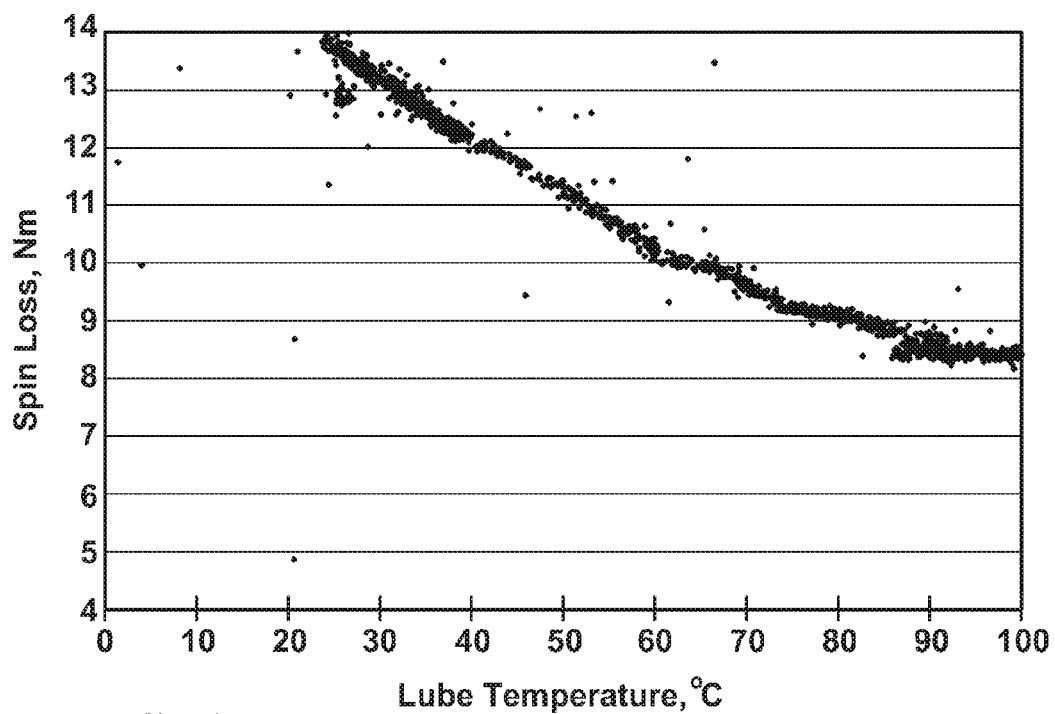
FIG. 1 is a data graph of spin loss versus transmission fluid temperature, in accordance with the present disclosure.

Referring now to the drawings, wherein the showings are for the purpose of illustrating certain exemplary embodiments only and not for the purpose of limiting the same, FIG. 1 is a data graph of spin loss versus transmission fluid temperature. Data shown in FIG. 1 demonstrate that transmission spin losses through a transmission change significantly with a change in temperature of the transmission fluid. The results indicate a relationship wherein there is a reduction in spin loss that correlates to increasing transmission fluid temperature. Testing was conducted on an exemplary 4-speed automatic transmission operating under specific fixed conditions, comprising third gear operation, 1500 rpm speed, with torque converter clutch locked (TCC On). The transmission demonstrated a change in spin loss from 14 Nm to less than 9 Nm when fluid temperature increased from a nominal cold-start temperature of 25 C to a typical operating temperature of 90 C.

Figure 2:
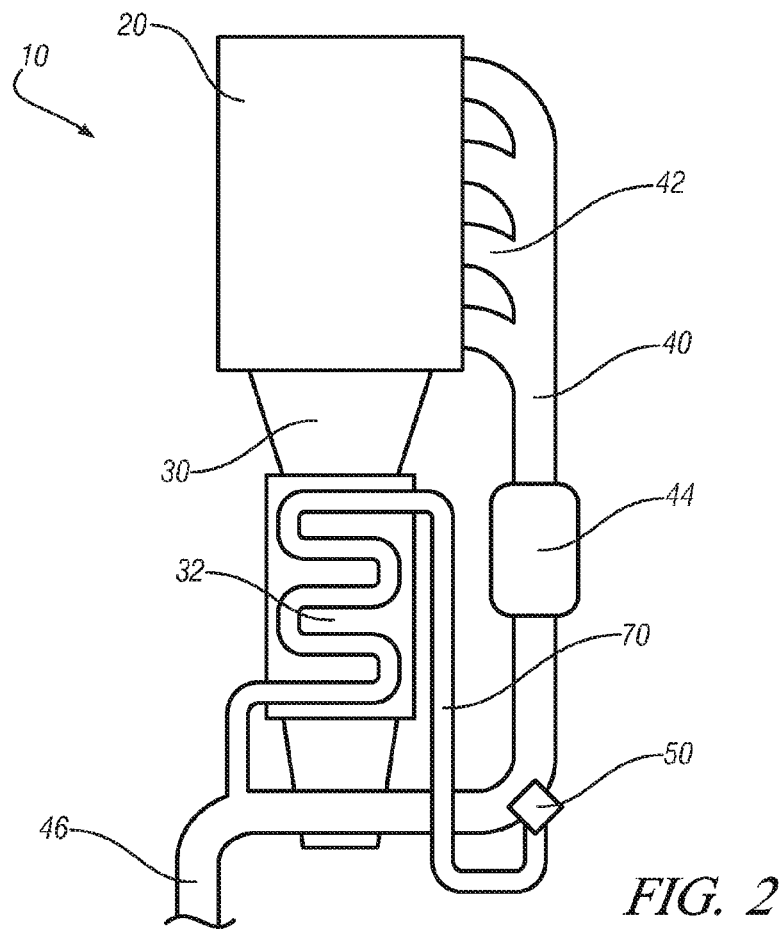
FIG. 2 is a schematic illustration of an engine, transmission and exhaust system, in accordance with an alternative embodiment of the present disclosure.
Figure 4:
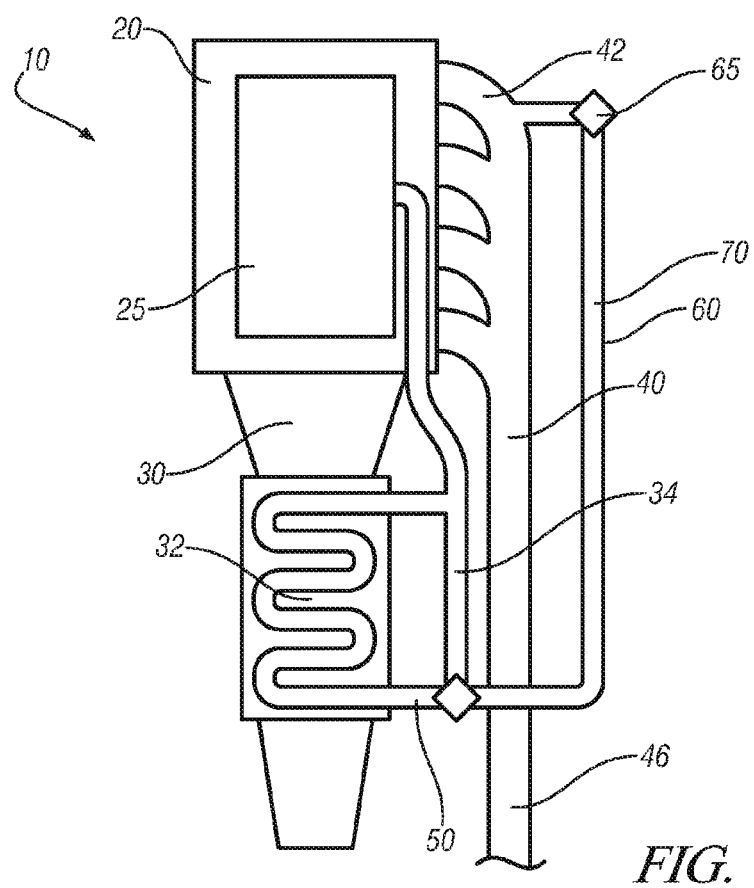
FIG. 4 is a schematic illustration of an engine, transmission and exhaust system, in accordance with an alternative embodiment of the present disclosure.
Figure 5:
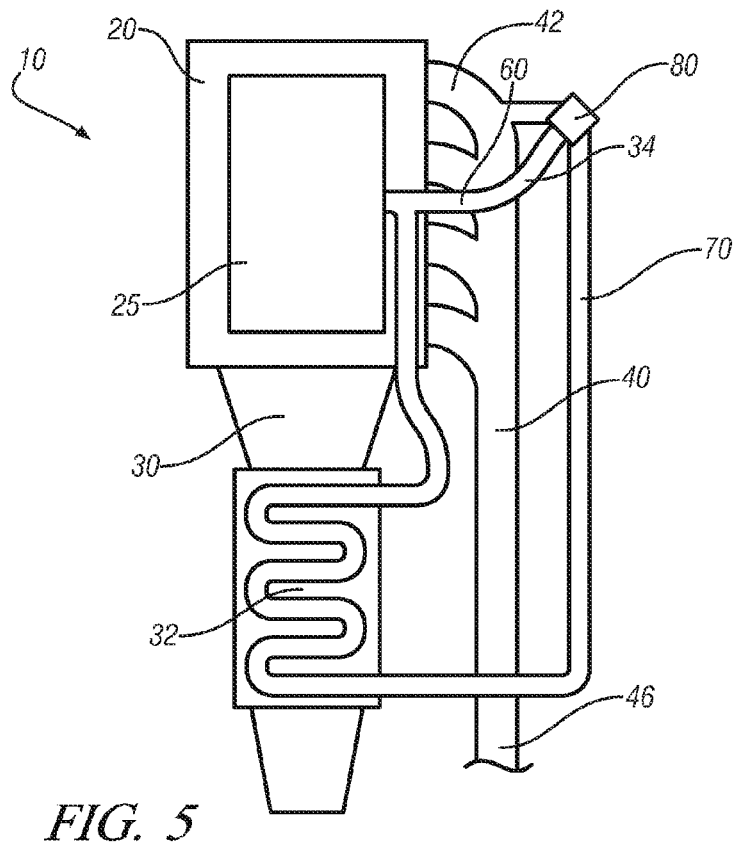
FIG. 5 is a schematic illustration of an engine, transmission and exhaust system, in accordance with an alternative embodiment of the present disclosure.

Embodiments of the present disclosure are operable to reduce the time transmission fluid of a transmission assembly 30 takes to reach steady state temperature. FIGS. 2, 4, 5 and 6 each depict a powertrain system of vehicle 10, comprising an engine 20, transmission assembly 30, and an exhaust system 40 comprising an exhaust manifold 42, an exhaust pipe 46, and a catalytic converter 44. FIGS. 2, 4, 5, and 6 each depict a heat exchanger device effective to transfer heat between engine exhaust flow and transmission fluid, each of which has been constructed in accordance with embodiments of the present disclosure. In FIGS. 2, 4, and 5, a transmission sump heat exchanger 32 is thermally coupled to a fluid reservoir or sump of the transmission assembly 30 and to the exhaust system 40 of engine 20 via an exhaust routing line 70. There is an exhaust gas flow valve 50 selectively operative to control flow of exhaust gas through the exhaust routing line 70 and the transmission sump heat exchanger 32, the selective operation based upon transmission fluid temperature. This is now described in detail.

Referring to FIG. 2, one alternative embodiment is shown. Transmission sump heat exchanger 32 includes an engine exhaust-to-transmission fluid heat exchanger positioned in thermal communication with the transmission fluid reservoir such that exhaust gas from engine 20 can heat the transmission fluid during a warm-up period of powertrain operation. Combustion within engine 20 quickly generates a hot exhaust gas feed stream which is expelled from engine 20 into exhaust system 40 through exhaust manifold 42. The exhaust gas feed stream flows through engine exhaust system 40 and catalytic converter 44 to flow valve 50. Flow valve 50, as aforementioned, is a device selectively operative to control flow of exhaust gas through the transmission sump heat exchanger 32. Flow valve 50 is commonly known in the art as a diverter valve, is keyed to the temperature of the transmission fluid as measured by commonly used sensors, and may be electrically or mechanically actuated. Flow valve 50 may be binary in operation, effecting either a fully open or fully diverted path in exhaust pipe 46, or flow valve 50 may operate through a range of operation, from fully open to fully diverted. Regarding the range through which flow valve 50 may operate in any embodiment, flow valve 50 may be positioned to fully close exhaust pipe 46 in favor of diverting exhaust gas into exhaust routing line 70, or flow valve 50 may be positioned at its maximum closed position to baffle a portion of the exhaust gas into exhaust gas routing line 70. Regarding the layout of engine 20 and exhaust system 40, the embodiment illustrated depicts an engine with four exhaust ports of engine 20 feeding into a single exhaust manifold 42; however, it will be appreciated by those having skill in the art that numerous configurations of engines are possible, and that the layout disclosed herein is merely exemplary. For example, in embodiments where engine 20 utilizes two exhaust manifolds 42, one on either side of engine 20, a single flow valve 50 may be utilized located on only one side of the exhaust system 40, or a pair of flow valves 50 may be utilized, one on each side of the exhaust system 40, with each flow valve 50 feeding to a separate exhaust routing line 70 which later join to feed into transmission sump heat exchanger 32. In any of the aforementioned arrangements, the flow valve 50 diverts some or all of the heated exhaust gas feed stream from exhaust system 40 through exhaust routing line 70 to transmission sump heat exchanger 32, wherein, as is well known in the art, structures in the heat exchanger preferably provide an expanded surface area for interface between the heated exhaust gases and the transmission fluid. Heat is drawn from the hot exhaust gas into the transmission fluid, thereby increasing the temperature of the transmission fluid. The exhaust gas returns to exhaust system 40 farther down the exhaust pipe 46 after passing through transmission sump heat exchanger 32. When the transmission fluid has reached a particular temperature set point, flow valve 50 is actuated and exhaust flow is directed away from exhaust routing line 70.

Figure 3:
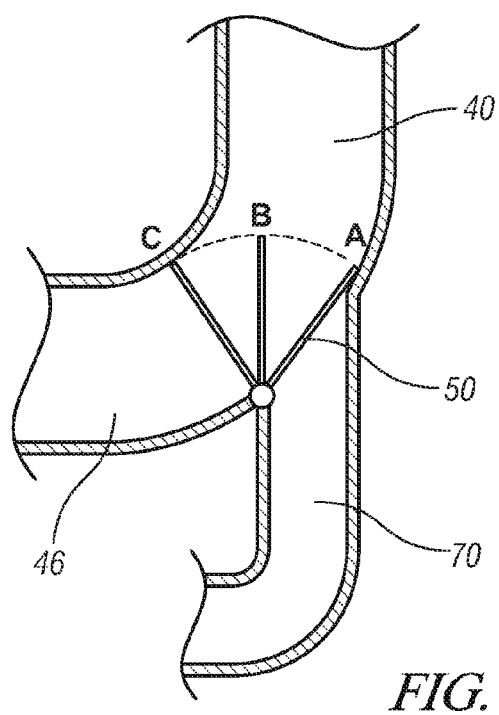
FIG. 3 is a schematic illustration of a flow valve in accordance with the present invention.

Referring now to FIG. 3, an exemplary flow valve 50 is illustrated in more detail. Flow valve 50 is incorporated into exhaust pipe 46 of exhaust system 40. Flow valve 50 is situated such that it acts as a selective diverter of exhaust gas in exhaust system 40 into exhaust routing line 70. As previously described, flow valve 50 may operate through a range of operation, from fully open to fully diverted. Position A of flow valve 50 as depicted in FIG. 3 shows flow valve 50 in a fully open mode position, directing all exhaust gas through exhaust pipe 46, thereby fully by-passing transmission sump heat exchanger 32. Position C of flow valve 50 as depicted in FIG. 3 shows flow valve 50 in a transmission heat mode position, directing all exhaust gas through exhaust pipe 46, thereby transferring as much heat to transmission sump heat exchanger 32 as possible. Position B of flow valve 50 as depicted in FIG. 3 shows flow valve 50 in a mid-range position, directing some of exhaust gas through exhaust pipe 46 and some of exhaust gas through transmission sump heat exchanger 32. As will be appreciated by those having skill in the art, exhaust gas flow, and particularly backpressure exerted within exhaust system 40, has significant impact upon the dynamics of engine 20. With such considerations in mind, it may be advantageous to only direct a portion of exhaust gas to transmission sump heat exchanger 32 depending on the flow characteristics of the exhaust routing line 70.

Referring now to FIGS. 4 and 5, alternate embodiments of the disclosure are depicted, incorporating flow through an exhaust gas recirculation (EGR) system 60. In these embodiments, engine 20 includes an intake manifold 25. As is well known in the art, EGR system 60 is used in certain configurations of engine 20 to reduce certain emissions and typically reroutes a portion of the exhaust gas feed flow back to the intake manifold 25. The embodiment which is shown in FIG. 4 depicts an exhaust gas flow routing scheme wherein exhaust gas is routed through the EGR system 60. EGR system 60 includes exhaust routing line 70 and EGR valve 65, which is incorporated into exhaust manifold 42 of exhaust system 40 and directs a portion of the exhaust gas feed stream, the exhaust gas recirculation feed stream ("EGR feed stream"), into exhaust routing line 70. Flow valve 50 is located in EGR system 60 to act as a diverter valve, selectively directing some portion of the EGR feed stream from EGR system 60 to transmission sump heat exchanger 32. Flow valve 50 for this embodiment acts similarly to flow valve 50 described previously in accordance with the embodiment of FIG. 2. When the temperature of the transmission fluid is below a set point, flow valve 50 is set to a transmission heat mode position, and some or all of the exhaust gas in EGR system 60 is diverted to transmission sump heat exchanger 32 in order to increase the temperature of the transmission fluid. The exhaust gas returns to EGR system 60 farther down the exhaust routing line 70 after passing through transmission sump heat exchanger 32 and is then fed to the intake manifold 25. When the temperature of the transmission fluid achieves a set point, flow valve 50 is moved to the fully open mode position, whereby all of the EGR feedstream is directed away from transmission sump heat exchanger 32 and is routed directly to the intake manifold 25.

Another alternative embodiment, which is shown in FIG. 5, utilizes a dual-mode flow valve 80. Dual-mode flow valve 80 performs the functions of EGR valve 65 and flow valve 50, previously described, as a single component and is incorporated into exhaust manifold 42 of exhaust system 40. In operation, the dual-mode flow valve 80 acts to select between various functions. In a fully open mode position, dual-mode flow valve 80 directs all of the exhaust gas through exhaust system 40, thereby bypassing both EGR system 60 and transmission sump heat exchanger 32. In an EGR mode position, dual-mode flow valve 80 diverts some portion of exhaust gas from exhaust system 40 through EGR system 60 to intake manifold 25 through by-pass circuit 34. In a transmission heat mode position, selected as a function of transmission fluid temperature, dual-mode flow valve 80 diverts some portion of exhaust gas through transmission sump heat exchanger 32. Another mode wherein some portion of the exhaust gas from the exhaust system 40 is diverted to the intake manifold via the bypass circuit 34 and the transmission sump heat exchanger 32 is also an option. When dual-mode flow valve 80 is in any position other than fully open, the diverted gas is eventually directed to intake manifold 25.

Figure 6:
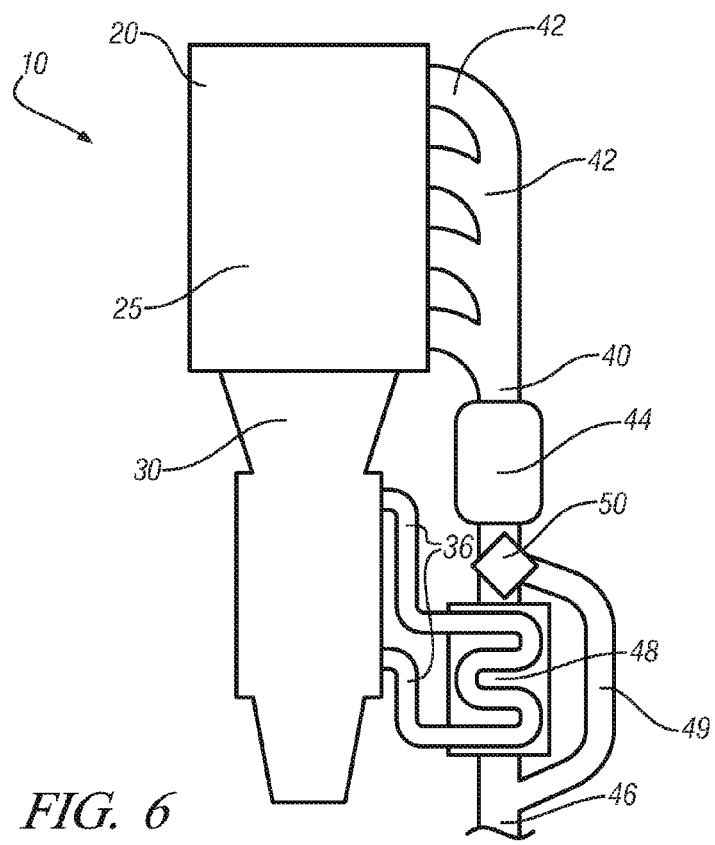
FIG. 6 is a schematic illustration of an engine, transmission and exhaust system, in accordance with an alternative embodiment of the present disclosure.

Another alternative embodiment, which is shown in FIG. 6, includes a system wherein transmission fluid is routed out of transmission assembly 30 through transmission fluid lines 36 through an exhaust pipe heat exchanger 48 thermally coupled to a portion of exhaust pipe 46. Exhaust pipe heat exchanger 48 utilizes heat exchanger technology well known to those in the art and is similar to transmission sump heat exchanger 32 previously described. Exhaust pipe heat exchanger 48 preferably provides an expanded surface area for interface between the heated exhaust gases and the transmission fluid, allowing heat to flow from the hot exhaust gas feed stream to the transmission fluid. Flow of exhaust gas through exhaust pipe heat exchanger 48 is selectively controlled by flow valve 50, as shown. In operation similar to the operation of the embodiments previously discussed, flow valve 50, in transmission heat mode position, selectively directs exhaust gas to exhaust pipe heat exchanger 48 when the transmission fluid temperature is below a set point or, alternatively, directs exhaust gas away from the exhaust pipe heat exchanger 48 into exhaust pipe heat exchanger by-pass circuit 49 when the transmission fluid temperature is above a set point. Transmission fluid, acting under pressure from within transmission assembly 30, flows through a transmission line 36, through exhaust pipe heat exchanger 48, and back through another transmission line 36 to transmission assembly 30. Flow through transmission lines 36 may be constant, without regard to whether flow valve 50 is in open mode or diverted mode, or flow through transmission lines 36 may be selectively ceased when flow valve 50 is set to the open position. In this way, the system selectively operates to heat transmission fluid to a set point utilizing hot exhaust gas generated in engine 20.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Apparatus for heating transmission fluid, comprising:
    an engine having an intake manifold and an EGR system;
    a transmission assembly;
    a heat exchanger effective to transfer heat between transmission fluid of the transmission assembly and an exhaust gas feed stream of the engine;
    an exhaust gas recirculation (EGR) valve, located upstream of an EGR system, for selectively diverting flow of an EGR portion of said exhaust gas feed stream into the EGR system while allowing flow of an exhaust portion of said exhaust gas feed stream directly through an exhaust pipe;
    a flow valve, located upstream of the heat exchanger within the EGR system, for selectively controlling flow of a first portion of said EGR portion through said heat exchanger based upon temperature of said transmission fluid, and selectively controlling flow of a second portion of said EGR portion directly through a by-pass circuit from said flow valve into said intake manifold of the engine; and
    wherein said first portion of said EGR portion passing through said heat exchanger is directed to said intake manifold of the engine, and said second portion of said EGR portion bypasses said heat exchanger in passing directly to said intake manifold of the engine.

2. The apparatus of claim 1, wherein said flow valve is electrically actuated.

3. The apparatus of claim 1, wherein said flow valve is mechanically actuated.

4. A method for heating transmission fluid with an exhaust gas feed stream from an engine, comprising:
    selectively operating an exhaust gas recirculation (EGR) valve based on requirements of the engine, said EGR valve located upstream of an EGR system;
    diverting with said EGR valve an EGR portion of said exhaust gas feed stream from the engine into the EGR system while allowing flow of an exhaust gas portion of said exhaust gas feed stream directly through an exhaust pipe;
    selectively operating a flow valve located upstream of a heat exchanger within the EGR system based upon temperature of transmission fluid from a transmission assembly;
    diverting with said flow valve a first portion of the EGR portion of the exhaust gas feed stream from the engine into the heat exchanger to thermally couple said EGR portion of said exhaust gas feed stream to said transmission fluid, where the first portion of the EGR portion diverted into the heat exchanger is recirculated into an intake manifold of the engine; and
    diverting with said flow valve a second portion of the EGR portion of the exhaust gas feed stream from the engine directly through a by-pass circuit from said flow valve into the intake manifold of the engine, thereby bypassing the heat exchanger.

5. The method of claim 4, wherein operation of said flow valve is accomplished electronically.

6. The method of claim 4, wherein operation of said flow valve is accomplished mechanically.

* * * * *